(12) United States Patent
Beck, II

(10) Patent No.: US 6,508,119 B2
(45) Date of Patent: Jan. 21, 2003

(54) LIQUID LEVEL MEASUREMENT AND FUEL TRANSDUCER USING ANISOTROPIC MAGNETORESISTANCE DEVICE

(75) Inventor: Charles W. Beck, II, Burleson, TX (US)

(73) Assignee: International Avionics, Inc., Addison, TX (US)

(*) Notice: Subject to any disclaimer, the term of this patent is extended or adjusted under 35 U.S.C. 154(b) by 0 days.

(21) Appl. No.: 09/912,725

(22) Filed: Jul. 23, 2001

(65) Prior Publication Data

US 2002/0043105 A1 Apr. 18, 2002

Related U.S. Application Data

(60) Provisional application No. 60/220,098, filed on Jul. 21, 2000.

(51) Int. Cl.[7] .................. G01F 23/00; G01F 23/36; G01F 23/32; H01L 43/08; G08B 21/00
(52) U.S. Cl. ..................... 73/291; 73/313; 73/317; 324/207.21; 340/623
(58) Field of Search .................. 73/DIG. 5, 291, 73/313, 317; 340/623; 116/229; 324/207.21

(56) References Cited

U.S. PATENT DOCUMENTS

| | | | | |
|---|---|---|---|---|
| 4,786,846 A | * | 11/1988 | Uchida | 318/482 |
| 5,156,048 A | * | 10/1992 | DeFigueiredo et al. | 73/308 |
| 5,189,911 A | * | 3/1993 | Ray et al. | 73/292 |
| 5,253,521 A | * | 10/1993 | Abramovich et al. | 73/306 |
| 5,406,200 A | * | 4/1995 | Begin et al. | 324/207.12 |
| 5,535,625 A | * | 7/1996 | Levy | 73/290 V |

* cited by examiner

Primary Examiner—Hezron Williams
Assistant Examiner—Katina Wilson
(74) Attorney, Agent, or Firm—Godwin Gruber P.C.; Arthur I. Navarro

(57) ABSTRACT

A fuel quantity transducer (20) suitable for use in a liquid level measurement system (30) uses an AMR device (30) to permit liquid level measurement. A flange (60) is fastened to the inside of a tank (12) and the AMR device (38) on the outside of the tank (12). A support (62) provides a channel shaped piece that is attached to the flange (60) and provides a pivot for a rotor (64). A stop pin (61) is pressed into the support (62) and provides a stop for the rotor (64) at each end of a ninety degree arc. The rotor (64) is a square bar counterbored for a magnet (42) and tapped laterally for a pivot rod. The magnet (42) is placed on the counterbore and retained such that the clearance between the magnet (42) and the flange is small. A float arm (80) is screwed into the axially threaded end of the rotor (64) and secured with a locking jam nut (82). The magnetic field produced by magnet (42) induces a current flow in the AMR device (38) which, in turn, affects the resistance of the ARM device (38) in relation to angle between the field and internal current flow through the ARM device (38).

20 Claims, 2 Drawing Sheets

LIQUID LEVEL MEASUREMENT AND FUEL TRANSDUCER USING ANISOTROPIC MAGNETORESISTANCE DEVICE

CROSS-REFERENCE TO RELATED APPLICATION

This application claims priority under 35 USC §119 based upon Provisional Patent Application number 60/220,098 filed Jul. 21, 2000.

The application is related to Provisional Application Serial No. 60/220,098 entitled "LIQUID LEVEL MEASUREMENT USING ANISOTROPIC MAGNETORESISTANCE DEVICE," by Charles W. Beck, filed Jul. 21, 2000, the entirety of which is incorporated herein by reference. This application claims priority of the aforementioned related provisional application.

TECHNICAL FIELD

The present invention relates generally to methods of liquid level measurement and related applications and more specifically to a liquid level measurement system and fuel transducer having an anisotropic magnetoresistance device that facilitates the measure of liquids, such as fuels in an aircraft fuel tanks.

BACKGROUND OF THE INVENTION

Without limiting the scope of the invention, its background is described in connection with liquid level measurement in to fuel tank applications, more specifically aircraft fuel tanks.

Liquid level measurement in aircraft, automobiles, boats and other vehicles has historically been measured by either of two methods: float or capacitance probe. In each of these techniques, the fuel tank and its contents are subject to electrical energy in the measuring technique. Recently, there have been serious safety concerns due to unexplained aircraft losses which may have been caused by a spark from the electrical equipment inside the fuel tank. Other techniques such as air pressure, optics, and magnetic sensors have been proposed or implemented with varying success.

A method of liquid level measurement utilizing a Hall Effect semiconductor device is discussed in the Honeywell Solid State Sensors Catalog. Determining the height of a float is one method of measuring the level of liquid in a tank. For example, a linear output Hall Effect transducer can be placed outside the tank while a magnet is placed inside tank, and moved by the motion of a float arm. As the liquid level moves up or down, the magnet moves relative to the transducer, causing a change in transducer output voltage.

A Hall Effect transducer allows liquid level measurement without any electrical connections inside the tank. The use of a Hall Effect transducer, however, requires an electronic interface to allow the output to be used with a gauge. While there are linearity and temperature effects that must be either suppressed or compensated, a far more onerous problem is that the mechanical design must be such that a change in the strength of the sensed magnetic field due to mechanical slack does not indicate a change in quantity. Additionally, "rare earth" magnets are generally required in any practical application.

Another method involves the use of a magnetic drive. In this method, two magnetic rotors are placed on either side of a non-ferrous plate which is used to cover an opening in either the side wall or top or bottom of the tank. The rotors, while on opposite sides of the plate, are arranged on axles each located on a common axis. Thus, when one rotor is turned, the other rotor follows the rotation due to the magnetic coupling between the two rotors. The torque available is in part a function of the offset of the poles (rotor diameter), magnetic strength (Gauss Level), and the distance between the rotors (Gap distance). Sufficient torque must be available to ensure close tracking of the following rotor and its readout device with the position of the driving rotor. This method does require multiple high strength "rare earth" magnets which could make it impractical for high yield low-cost applications.

Accordingly, there is a need for a non-intrusive means of liquid level measurements that is cost-effective and does not require the use of expensive "rare earth" magnets. Such a device would permit measurement of fuel levels in aircraft, boats, and other vehicles and would provide numerous advantages.

SUMMARY OF THE INVENTION

Disclosed in one enbodiment is a non-intrusive liquid level measurement system for measuring a quantity of liquid in a tank. The liquid level measurement system comprises an Anisotropic Magnetroresistance (AMR) device located outside the tank. The magnetic device is located inside the tank opposite of the AMR device with a mechanical interface providing a bridge between the AMR device and the magnetic device. The clearance between the AMR device and the Magnetic device is maintained such as that a magnetic field produced by the magnetic device can affect the resistance of the AMR device, the resistance being proportional to a measure of liquid in the tank. The measurement system can further comprise a float assembly coupled to the magnetic device in the form of a float arm that rotates about an arc in relation to the liquid in the tank, with the angle of the arc communicated to the magnetic device by rotational motion.

The system can further comprise an electrical interface communicably coupled to the AMR device, delivering a single output that is representative of a level of liquid in the tank. A physical connector can be used for delivering the voltage output to an external readout such as fuel gauge commonly found on an aircraft.

Further disclosed is a fuel quantity transducer for measuring the quantity of a fuel in a fuel tank. The transducer comprises an AMR device located outside the fuel tank and a magnet located inside the fuel tank. A flange provides a support between the AMR devivce and the magnet with the flange adapted to be attached to the wall of the fuel tank. The clearance between the AMR device and the magnet is maintained such that a magnetic field produced by the magnet can affect the resistance of the AMR device, the resistance being proportional to a measure of fuel in the fuel tank. The fuel quantity transducer can further comprise a support for holding the magnet in place within the fuel tank. The fuel quantity transducer can further comprise a row or coupled to the support and having two ends, a completed rod at one end and the magnet secured at the other end, the rotor adapted to rotational motion by an axis. A float arm is coupled to the rotor pivot arm and adapted for rotation about an arc in relation to the amount of fuel in the fuel tank. The rotor can take the form of a square-bar tapped axially at one end and counterbored for the magnet at the other end.

In one embodiment, the fuel quantity transducer includes a circuit board that comprises an interface for communication of an output signal related to the measured quantity of fuel tank and a plurality of electronic components that produce the output signal in relation to the properties of the AMR device. A cover can be placed over the electronic components to protect them from the elements and the environment.

An advantage of the invention is that it provides a non-intrusive means of liquid level measurement.

Another advantage of the invention is that the use of an AMR device eliminates the requirement of using expensive rare earth magnets.

BRIEF DESCRIPTION OF THE DRAWINGS

The advantages of the invention including specific embodiments will be understood by those of ordinary skill in the art by reference to the following detailed description taken in conjunction with the appended drawings in which.

References and terms in the detailed description correspond to like references and terms in the figures unless otherwise indicated.

DETAILED DESCRIPTION OF THE PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

The present invention provides a liquid level measuring system that utilizes magnetoresistive devices to enable applications in non-electrically invasive measurements of liquid level, angle of attack, and control surface deflection. The device utilizes Anisotropic Magnetoresistance (AMR) properties. AMR occurs in ferrous materials and is a change in resistance when a magnetic field greater than 80 Oersteds is applied. The resistance of the device is a function of the angle between the applied field and the internal current flow in the device. By arranging the device in the form of a Wheatstone Bridge, excitation by a power supply across two opposite points of the bridge will produce a voltage across the other two points of the bridge, which voltage will vary as a function of the direction of the lines of force of the applied magnetic field. Thus, lesser expensive magnets such as Alnico or ceramic magnets may be used to produce the field.

The magnetoresistive device is fixed in place adjacent to a moving magnet, typically one that rotates. The magnet may be driven by various means such as a float arm. Alternatively, the rotating magnet can be placed in a gear driven probe or a control surface or vane sensing airflow can be used. The fixed magnetoresistive device with its attendant electrical connections, and the moving magnet may be separated by only an air gap or, in the case of a fuel quantity sensor, separated by a non-ferrous wall that contains the fuel.

Figure 1:
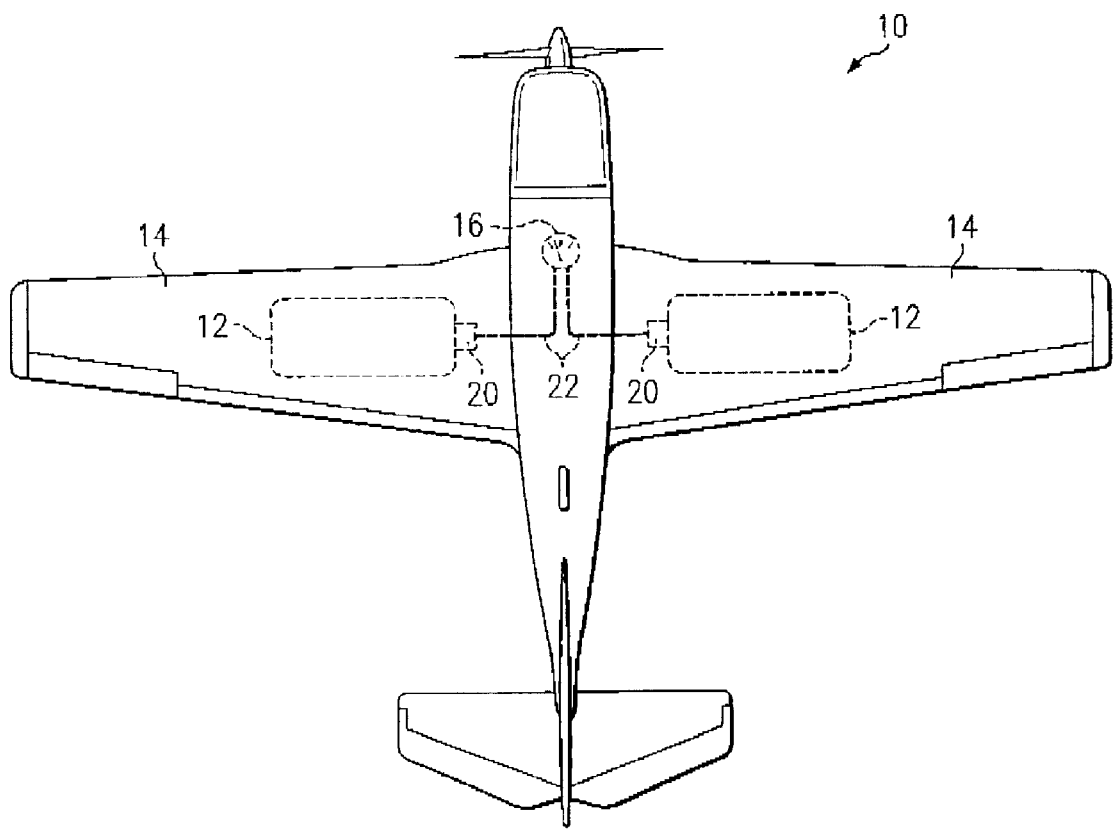
FIG. 1 shows an aircraft and the location of its fuel tanks.

To fully appreciate the invention, reference is made to FIG. 1, which shows an airplane 10 having a pair of tanks 12 wherein fuel is stored. Each tank 12 is shown in a typical location of a corresponding wing 14 of the airplane 10 such that each wing 14 holds its own tank 12. For simplicity, the singular and plural forms of a component of the airplane 10 will be used interchangeably throughout.

Of course, an accurate indication of the amount of fuel within a tank 12 is an important piece of information to the pilot operating the airplane 10. If airplane 10 is using fuel at a rate greater than the rate planned by the pilot, the airplane 10 may run out of fuel before reaching its destination. Therefore, a fuel gauge 16 is provided for the pilot and coupled to fuel quantity transducers 20 associated to each tank 12. In operation, each transducer 20 is capable of determining the amount of fuel presently available in a tank 12 and relaying a measurement, typically in the form of an analog signal representing the voltage output of the transducer 20, to gauge 16 via signal paths 22 for readout to the pilot on the gauge 16.

Two important design criteria of the fuel quantity transducers 20 are safety and cost. Specifically, since fuel vapors are extremely explosive, it is desirable to keep electrical circuits from intruding into the inside of tanks 12. Thus, the fuel quantity transducer 20 of the present invention provides the pilot with a non-intrusive means of returning an accurate indication of the liquid level in a fuel tank 12 to the gauge 16.

While a Hall Effect transducer allows liquid level measurement without any electrical connections inside a tank 12, the use of a Hall Effect transducer requires an electronic interface that suffers from several disadvantages. First, the electronics may be prone to linearity and temperature effects that must be either suppressed or compensated. More serious, however, is the fact that the mechanical design of Hall Effect transducers is such that a change in the strength of the sensed magnetic field due to mechanical slack does not indicate a change in quantity. Finally, for most practical applications of a Hall Effect transducer, expensive "rare earth" magnets are required.

Thus, the present invention provides a fuel quantity transducer 20 that substantially eliminates the problems associated with prior art transducers, such as the Hall Effect transducers. More specifically, the fuel quantity transducer 20 is non-intrusive and cost effective to manufacture in quantity since it does not rely on the magnetic properties of a rare earth magnets to operate.

Figure 2:
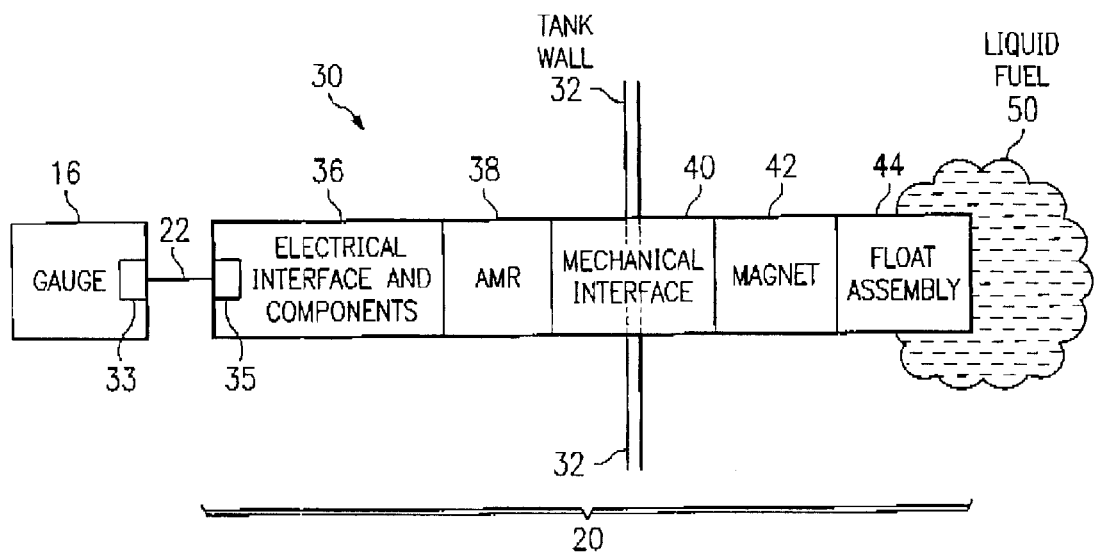
FIG. 2 is a general block diagram of a liquid level measurement system according to the invention.

With reference to FIG. 2, therein is shown a general block diagram for liquid level measurement system, denoted generally as 30, according to the invention. As shown, liquid level measurement system 30 includes a fuel gauge 16 coupled to an electrical interface 36 of the liquid level transducer 20 via signal path 22. The electrical interface 36 includes an output 35 that delivers a signal representative of the measured level of liquid 50 within a liquid holding tank, such as fuel tank 12.

The electrical interface 36 includes all of the various electronic components and connections necessary to convert a level reading from the float assembly 44 within the tank to and output signal appropriate to the fuel gauge 16. Examples of such components include the electronic circuits required to sum the outputs from multiple quantity transducers, linearize or otherwise curvefit the output as required for the gauge, process the output to match the type of gauge used, either analog or digital, and provide low fuel warning as required, compute mass of fuel in tank, . . . i.e., pounds of fuel rather than gallons of fuel, as well as any additional processing that may be desired such as range, time remaining, etc.

Coupled to the electrical interface 36 and opposite the fuel gauge 16 is an Anisotropic Magnetoresistance (AMR)

device 38 or other component having AMR properties. As is known in the art, AMR occurs in ferrous materials and is characterized by a change in resistance when a magnetic field greater is applied. Therefore, the resistance of the AMR device 38 is a function of the angle between the applied field and the internal current flow in the device 38. By using the AMR device 38, the invention provides a liquid level measurement system 30 that is non-intrusive and avoids the costs associated with using rare earth magnets.

A mechanical interface 40 provides bridge between the AMR device 38 outside the tank and the components, including magnet 42, of the liquid level measurement system 30 inside the tank. This arrangement is illustrated by the configuration of the tank wall 32 through the mechanical interface 40, such that the electronic interface and components 36 of the liquid level measurement system 30 are non-intrusive into the tank 12. A magnet 42 is position within the tank to create a magnetic field whose strength is proportional to the position of the float assembly 44. The magnetic field produced by magnet 42 induces a current flow in the AMR device 38 which, in turn, affects the resistance of the ARM device 38 in relatiqn to the angle between the field and internal current flow through the ARM device 38. In this way, a liquid level measurement of the liquid 50 within the tank 12 can be determined without intrusion into the tank 12 by the electronic interface 36 and without using expensive rare earth magnets.

Figure 3:
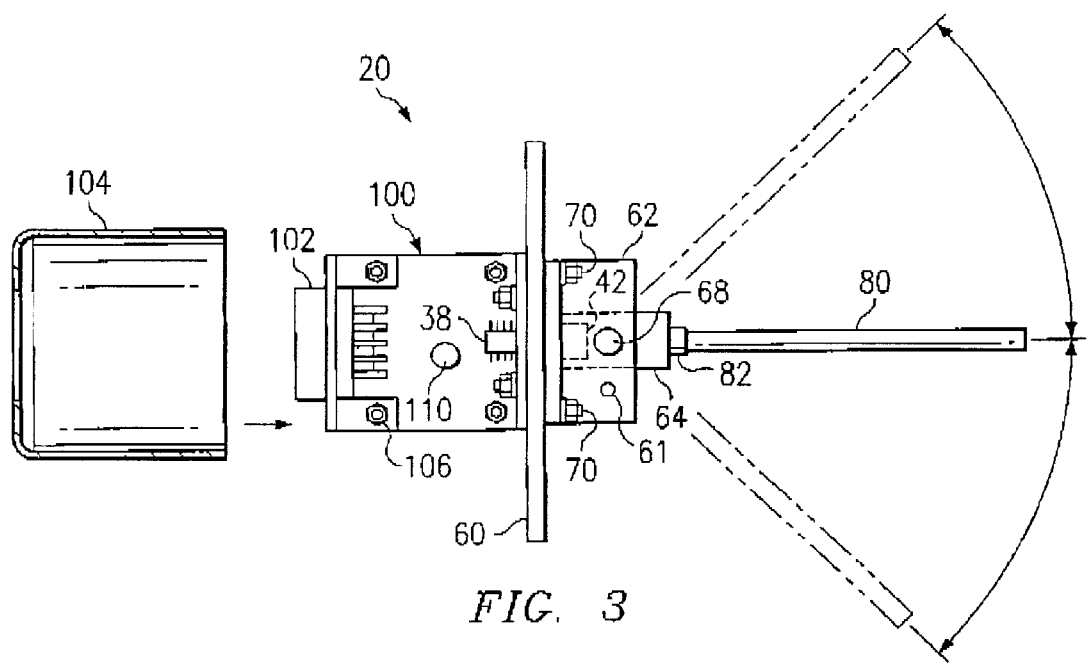
FIG. 3 is a detailed system diagram of the fuel quantity transducer device of the invention.

Turning to FIG. 3, therein is shown a detailed component diagram of a fuel quantity transducer, denoted generally as 20, suitable for use in the liquid level measurement system 30. Preferably, all component parts, except fasteners, of the fuel quantity transducer 20 are fabricated of non-ferrous metal. The flange 60 is preferably a flat piece with appropriate means to fasten the transducer 20 to an inside wall of the tank 12 such that the AMR device 38 is located on the outside of the tank 12. In one embodiment, 4-40 threaded studs 70 are pressed into blind holes in the flange 60 such that, when installed, there are no openings of any sort through the flange 60.

A support 62 forms a channel shaped piece that is attached to the flange 60 and provides a base for securing a pivot means or rotor 64. In one embodiment, the support 62 includes a threaded rod or screw (not shown), threaded 10-32, that screws through the support 62 and the rotor 64. This allows the rotor 64 to turn on the screw while providing lateral motion of the rotor 64. A stop pin 61, such as a Rollpin, is pressed into the support 62 and provides a stop for the rotor 64 at each end of a ninety degree arc traversed by the float arm 80.

The rotor 64 can comprise a square bar tapped 5-40 axially on one end, counterbored for the magnet 42 on the other, and tapped 10-32 laterally for the pivot rod having an axle 68 about which it rotates. A magnet 42 is placed on the counterbore and retained such that the clearance between the magnet 42 and the flange 60 is small. In one embodiment, this clearance is on the order of 0.010" to 0.020". The spacing is not important so long as the AMR device 38 is well saturated by the field of the magnet 42 in all positions of the magnet 42. In one embodiment, the magnet 42 is retained in the rotor 64 by swagging the machined end of the rotor 64 over the end of the magnet 42. The float arm 80, threaded 5-40 in one embodiment, is screwed into the 5-40 axially threaded end of the rotor 64 and secured with a locking jam nut 82.

On the outside of the tank, a circuit board 100 provides a support which is attached to the flange 60. The circuit board 100 is designed to place the AMR device 38 near the flange 60. The clearance between the AMR device 38 and the flange 60 can be on the order of 0.010" to 0.020". Also, the AMR device 38 is oriented such that it properly intersects the magnetic field flux lines produced by the magnet 42. In this way, the magnetic field produced by the magnet 42 induces a current in the AMR device 38 and the resistance of the AMR device 38, in turn, is altered in proportion to the angle between the field and the induced current resulting in an output signal through connector 102 that is a measure of the quantity of liquid 50.

The circuit board 100 also provides a mount for a connector 102 which provides an interface to the fuel gauge 16 or other outside device. In one embodiment, a cover 104 is retained over the circuit board 100 via connecting locking screws 106 which hold the cover 104 in contact with the flange 60 and protecting the circuit board 100 and its electronic components from the environment in which it is used as surrounding elements.

The circuit board 100 may also include a temperature sensor 110 which can be used to calculate mass of fuel in the tank since a float type using a float arm 80 is able of measuring volume of fuel.

While the present invention has been described in connection with a liquid lever measuring system 30 for detecting levels of fuel in an aircraft fuel tank, the present invention also contemplates the use of an AMR device, such as AMR device 38, in an angle of attack sensor (not shown). Such a sensor would operate using a magnetoresistive sensor type angle of attack system that functions in a similar manner. For example, the electronic subassembly of a such an angle of attach sensor would consist of a bracket bolted on the nose curvature of the wing 14. A vane with a magnet attached is also affixed to the bracket adjacent to the sensor and pivoted in such a manner so as to move in an arc over a range of angle, some 30 degrees. The vane can extend through the nose curvature of the wing 14 and allowed to rotate and align itself with the relative wind. The electrical output of such a magnetoresistive sensor would be amplified and displayed on an instrument panel mounted gauge showing the angle of attack to the aircrew.

An AMR device, such as AMR device 38, can also be used in a shell warning sensor. In particular, a magnetoresistive stall warning sensor functions in a manner similar to the magnetoresistive angle of attack sensor except that the output is a discrete output that indicates to the aircrew that the angle of attack for the airfoil to stall has occurred. Current stall warning sensors are generally one of two types. One method uses an opening in the leading edge of the wing that is connected to a tube leading to the aircrew compartment. As the angle of attack increases, the opening acts as a "whistle" and produces an audible sound to warn the aircrew. This technique is a low performance design and is suitable only on slower, low altitude aircraft.

The more common stall warning sensor consists of a bracket bolted into the nose curvature of the wing with a vane affixed to the bracket and pivoted in such a manner so as to move in an arc over a range of some 30 degrees. This vane extends through the nose curvature of the wing and is allowed to rotate to align itself with the relative wind. A low actuation force switch is affixed to the bracket such that at a particular angle of attack, the switch is actuated producing an electrical output to a stall warning indicator. Problems with this type sensor include inaccuracies due to the force required to actuate the switch, sticking of the switch producing a continuous false alarm, and calibration errors due to installation. Calibration consists of adjusting the position of the bracket by trial and error with slotted holes over a series of test flights.

The present invention also enables an improved method of calibrating a magnetoresistive stall warning sensor. According to the invention, a complete magnetoresistive warning sensor system is provided that consists of the electronic subassembly with a bracket bolted into the nose curvature of the wing. The bolt holes are fixed, rather than slotted, thus fixing the position of the bracket with no mechanical adjustment allowed. A vane with a magnet attached is also affixed to the bracket adjacent to the sensor and pivoted in such a manner so as to move in an arc over a range of some 30 degrees. This vane extends through the nose curvature of the wing and is allowed to rotate to align itself with the relative wind.

The electrical output of the magnetoresistive sensor is amplified and sent to one input of tan electronic comparator. The other input of this electronic comparator is provided from the output of an electronic digital rheostat. A calibrate command input is gated with a signal from the output of the comparator. To calibrate the system, a calibration test set is connected to the magnetoresistive stall warning sensor through a calibration connector available to the test aircrew. Prior to the test flight, the calibration test set initializes the electronic digital rheostat by placing it in the extreme down position. During the calibration flight, the test aircrew establishes the angle of attack in flight at which point the stall warning should activate. The calibrate switch on the calibration test set is momentarily depressed which provides a continuous signal to the gate. The output signal from the gate is applied to the up command input continuously until the comparator changes state. At this point, the gate interrupts the up command input signal, stopping the change in the output of the electronic digital rheostat. The calibration test set is removed and the calibration connector stowed.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description.

What is claimed is:

1. A non-intrusive liquid level measurement system for measuring a quantity of liquid in a tank comprising:
    an anisotropic magnetoresistance device located outside said tank;
    a magnetic device located inside said tank; and
    a mechanical interface providing a bridge between said anisotropic magnetoresistance device and said magnetic device;
    wherein the clearance between said anisotropic magnetoresistance device and said magnetic device is maintained such that a magnetic field produced by the magnetic device can affect the resistance of the anisotropic magnetoresistance device, the resistance of the anisotropic magnetoresistance device being a proportional measure of the liquid level in said tank.

2. The non-intrusive liquid level measurement system of claim 1 further comprising a float assembly communicably coupled to said magnetic device.

3. The non-intrusive liquid level measurement system of claim 2 wherein said float assembly includes a float arm that rotates about an arc in relation to the amount of liquid in said tank.

4. The non-intrusive liquid level measurement system of claim 3 wherein the angle of said arc is communicated to said magnetic device by rotational motion.

5. The non-intrusive liquid level measurement system of claim 1 further comprising an electrical interface communicably coupled to said anisotropic magnetoresistance device for delivering a signal output.

6. The non-intrusive liquid level measurement system of claim 5 wherein said electrical interface comprises a plurality of electronic components for producing a voltage signal representative of the level of liquid in said tank.

7. The non-intrusive liquid level measurement system of claim 6 wherein said electrical interface comprises a physical connector for delivering said voltage signal.

8. The non-intrusive liquid level measurement system of claim 7 further comprising a gauge communicably coupled to said connector and adapted for producing a liquid level readout for use by a human.

9. The non-intrusive liquid level measurement system of claim 1 wherein said mechanical interface comprises a flange with first and second sides coupled to inner and outer walls of said tank.

10. The non-intrusive liquid level measurement system of claim 9 further comprising:
    a circuit board attached to the first side of said flange and adapted for supporting said anisotropic magnetoresistance device on the outside of said tank; and
    a support attached to the second side of said flange and adapted for supporting said magnetic device on the inside of said tank.

11. A fuel quantity transducer for measuring the quantity of fuel in a fuel tank comprising:
    an anisotropic magnetoresistance device locate outside the fuel tank;
    a magnet located inside the fuel tank; and
    a flange providing a support between said anisotropic magnetoresistance device and said magnet, said flange adapted to be attached to the wall of said fuel tank;
    wherein the clearance between said anisotropic magnetoresistance device and said magnet is maintained such that a magnetic field produced by the magnet can affect the resistance of the anisotropic magnetoresistance device, the resistance of the anisotropic magnetoresistance device being a proportional measure of the fuel in the fuel tank.

12. The fuel quantity transducer of claim 11 further comprising a support for holding said magnet in place within said fuel tank.

13. The fuel quantity transducer of claim 12 further comprising:
    a rotor coupled to said support and having two ends, a pivot rod at one end and the magnet secured at the other end, the pivot rod adapted for rotation about an axis; and
    a float arm coupled to the pivot arm and adapted for rotation about an arc in relation to the amount of fuel in said fuel tank.

14. The fuel quantity transducer of claim 13 wherein said rotor comprises square bar tapped axially on one end and counterbored for the magnet at the other end.

15. The fuel quantity transducer of claim 11 further comprising a circuit board attached to the flange on the outside of the fuel tank adapted for supporting said anisotropic magnetoresistance device.

16. The fuel quantity transducer of claim 15 wherein said circuit board further comprises:
    an interface for communication an output signal related to a measured quantity of fuel in the fuel tank;
    a plurality of electronic components for producing said output signal in relation to the resistive properties of said anisotropic magnetoresistance device.

17. The fuel quantity transducer of claim 16 wherein said interface comprises a standard connector.

18. The fuel quantity transducer of claim 16 wherein said plurality of electronic components include electronic circuits required to sum the outputs from multiple quantity transducers, linearize or otherwise curve-fit the output as required for a fuel gauge, process the output to match the type of gauge used, either analog or digital, and provide low fuel warning as required, compute mass of fuel in tank.

19. The fuel quantity transducer of claim 16 further comprising a cover for protecting said electronic components.

20. The fuel quantity transducer of claim 16 further comprising a temperature sensor coupled to said circuit board.

* * * * *